July 10, 1962    B. BOND ET AL    3,043,897
WET CELL BATTERY HAVING DEPOLARIZING MEANS
Filed Oct. 2, 1959
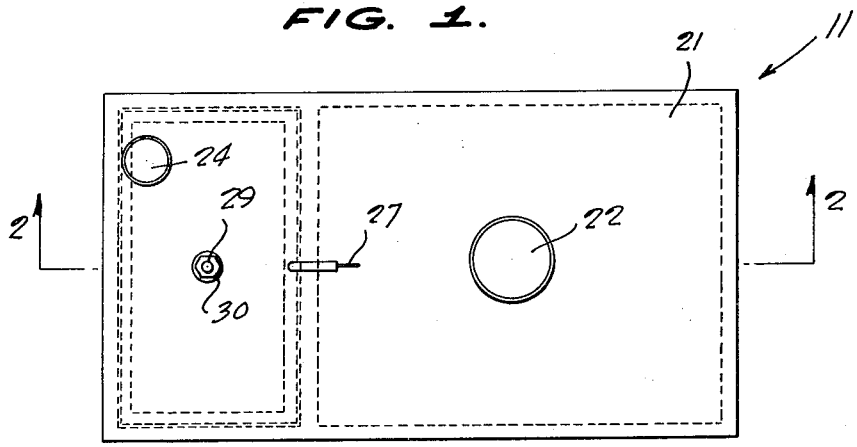
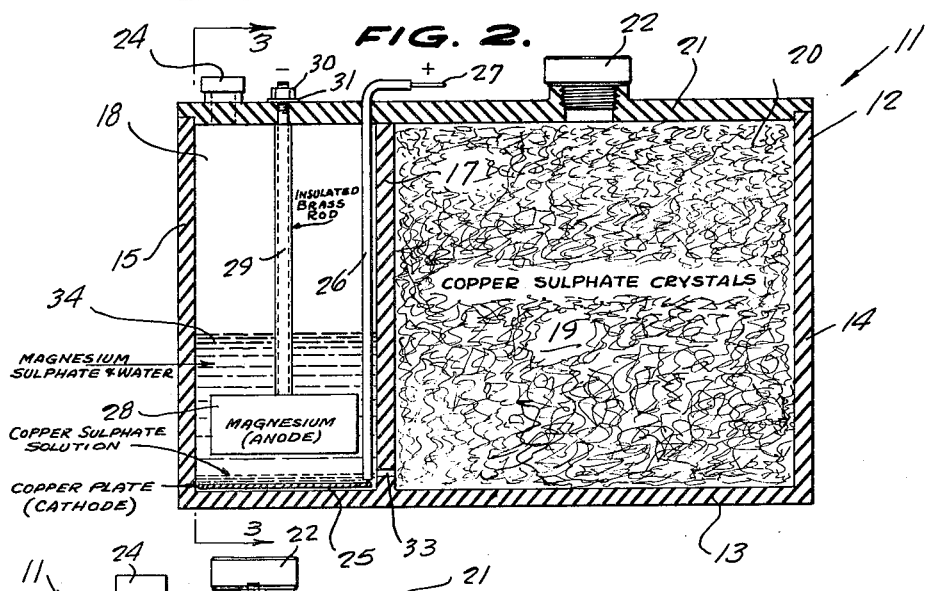
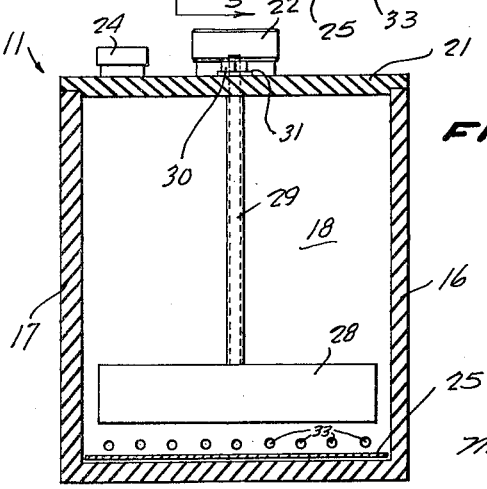
INVENTORS
BETHEL BOND,
JOSEPH A. SOUTH,
BY
McMorrow, Berman + Davidson
ATTORNEYS

United States Patent Office 3,043,897
Patented July 10, 1962

3,043,897
WET CELL BATTERY HAVING DEPOLARIZING MEANS

Bethel Bond, 1101 Semands Ave., P.O. Box 101, and Joseph A. South, P.O. Box 165, both of Conroe, Tex.
Filed Oct. 2, 1959, Ser. No. 843,973
1 Claim. (Cl. 136—83)

This invention relates to batteries, and more particularly to a wet cell battery of the type provided with depolarizing means.

A main object of the invention is to provide a novel and improved primary cell utilizing the potential difference between dissimilar metals or substances in the presence of a suitable electrolyte solution, the cell being relatively simple in construction, being arranged so that it may be stored indefinitely and may be placed in operation merely by addition of water, and being provided with depolarizing means which is maintained effective for relatively long periods of time and which may be readily replenished without interrupting the operation of the cell.

A further object of the invention is to provide an improved wet cell battery of the type provided with self-containing depolarizing means employing copper sulphate or a similar type of depolarizing material, the cell being relatively inexpensive to fabricate, being durable in construction, being easy to rehabilitate when the anode thereof becomes depleted, and providing a steady delivery of current over long periods of time.

A still further object of the invention is to provide an improved wet cell battery which is especially suitable for use in isolated locations such as in conjunction with warning lights, buoys, marine lighting devices, cathodic protection installations, and stand-by power applications, the battery involving only a few parts, being easy to maintain in service, and being relatively compact in size and light in weight.

Further objects and advantages of the invention will become apparent from the following description and claims, and from the accompanying drawings, wherein:

FIGURE 1 is a top plan view of an improved wet cell battery constructed in accordance with the present invention.

FIGURE 2 is a vertical cross sectional view taken on the line 2—2 of FIGURE 1.

FIGURE 3 is a transverse vertical cross sectional view taken on the line 3—3 of FIGURE 2.

Referring to the drawings, an improved wet cell battery assembly constructed in accordance with the present invention is designated generally at 11. The battery comprises a generally rectangular case 12 constructed of hard rubber, plastic, or other suitable insulating material impervious to the chemical solutions employed in the battery and having adequate physical strength. The casing 12 comprises a bottom wall 13, vertical end walls 14 and 15 and vertical front and rear walls 16 and 17. A vertical transverse internal partition wall 17' is formed integrally with the case and divides the case into a first compartment 18, containing the main components of the wet cell battery, and a second compartment 19 of substantial volume, containing the depolarizing material, which in the embodiment illustrated herein consists of copper sulphate crystals, designated by the reference numeral 20.

The battery case 12 is provided with the top cover 21 which may be detachably secured to the top rim of the case in any suitable manner, so that it may be readily removed whenever it is necessary to replace the components of the battery. The top wall 21 is provided over the central portion of the compartment 19 with the removable filler plug 22, which may be removed when it is necessary to replenish the depolarizing material 20, and is likewise provided with a removable filler plug 24 located over a corner portion of the battery compartment 18, for the purpose of allowing water or electrolyte material to be placed in said battery compartment.

Designated at 25 is a horizontal, plate-like body of copper which is generally rectangular in shape and which is disposed in the bottom of the battery compartment 18, said body defining a cathode. Connected to the copper cathode plate 25 is an insulated conductor 26 which rises vertically adjacent the partition wall 17' and extends through a suitable aperture provided therefor in the top wall 21, the terminal of the conductor 26 being shown at 27 and being adapted to be connected to the positive terminal of the external load with which the battery is employed.

Designated at 28 is the battery anode which in the illustrated embodiment comprises a block or grid of magnesium which is supported above and in vertically spaced relationship to the cathode 25 by a vertical insulated brass rod 29 which extends through an aperture provided therefor in the top wall 21 and which is provided with a supporting nut 30, as shown in FIGURES 2 and 3, which engages on a washer 31 bearing on the top wall 21. The top end of the insulated brass rod 29 defines a terminal adapted to be connected to the negative terminal of the external load to which the battery is connected.

A horizontal row of spaced apertures 33 are provided in the lower portion of the partition wall 17', said apertures being located at a height slightly above the copper cathode plate 25, and being located a substantial distance below the magnesium anode 28.

As previously mentioned, the compartment 19 contains copper sulphate crystals which operate as the depolarizing means when the battery is placed in operation.

In place of the holes 33, a horizontal slot may be employed, since the purpose of the apertures 33 is merely to provide a communicative connection between the lower portion of the battery case 18 and the depolarizer compartment 19.

To place the battery in operation, a strong solution of suitable electrolyte, for example, a strong solution of magnesium sulphate in water is poured into the battery compartment 18 through the filling opening by the removal of the filler plug 24. Sufficient electrolyte is furnished to bring the solution level well above the top of the magnesium anode 28, as shown in FIGURE 2. The electrolyte solution enters the depolarizer compartment 19 through the openings 33 and mixes with the copper sulphate, soon providing a saturated solution thereof. Since the copper sulphate solution has substantially greater density than the magnesium sulphate solution, it flows back into the battery compartment 18 through the openings 33, displacing the magnesium sulphate solution over the copper cathode 25 to a height substantially that of the openings 33. Thus, a layer of copper sulphate solution is provided immediately over the copper cathode 25, acting to remove hydrogen from the cathode as rapidly as it is formed, and thus permitting a steady delivery of current by the cell. Depolarization action continues as long as the strength of the copper sulphate solution is maintained, and this can be for an indefinite length of time, since new crystals may be added to the supply of depolarizing crystals in the compartment 19 at any time without interrupting the operation of the cell.

While the specific embodiment of the invention illustrated herein employs magnesium and copper as the battery electrodes and magnesium sulphate solution as the electrolyte, the structure may be embodied in a battery employing other dissimilar metals having a potential difference therebetween, in conjunction with a suitable electrolyte solution. The invention is operable even in the case where an electrolyte of the paste type is employed.

Numerous variations in the specific structure are obviously possible, within the spirit of the present invention. For example, the depolarizing material may be placed in a container with a closed top and with suitable apertures provided near the bottom of the container, the container being positioned directly on the cathode. Similarly, the container for the depolarizer may comprise a tube with an open top and with a notched or slotted bottom, the tube being supported on the cathode with the top of the tube extending above the surface of the electrolyte.

A battery constructed in accordance with the present invention may be connected in parallel or series with other similar batteries, as required. The battery is of special utility in supplying current to devices in isolated or remote locations, as well as for general purposes wherein a reliable and steady current supply is required. For example, the battery may be used in hand lanterns, warning lights, buoys, marine platforms, and similar marine applications, cathodic protection installations, and stand-by power applications.

The ingredients of the electrolyte may be placed in the battery in a dry state, and the battery may then be stored indefinitely. To place the battery in operation, it is merely necessary to furnish water to the battery compartment 18, whereby to form the electrolyte solution.

Since the copper cathode is not dissipated, and the magnesium anode is easily and quickly replaced, the batteries may be rehabilitated as many times as desired.

While a specific embodiment of an improved primary battery structure and ingredients associated with the battery have been disclosed in the foregoing description, it will be understood that various modifications within the spirit of the invention may occur to those skilled in the art. Therefore it is intended that no limitations be placed on the invention except as defined by the scope of the appended claim.

What is claimed is:

A battery comprising a case of uniform depth, a planar vertical partition wall dividing said case into two compartments of equal depth, one of said compartments defining a container and the other of said compartments defining a receptacle independent of said container, said container and said receptacle being disposed in juxtaposed relationship with said planar partition wall comprising a single side wall common to said container and said receptacle, a horizontally disposed cathode plate in the bottom portion of said container, an anode, means supporting said anode in said container above and vertically spaced from said cathode plate, a solution including an electrolyte in said container in contact with both of said cathode plate and said anode, said receptacle containing depolarizing material in a substantially dry solid state, said planar partition wall comprising the side wall common to said container and said receptacle having at least one aperture therethrough at a location between said cathode plate and said anode to provide communication between said container and said receptacle, respective terminals connected to said cathode plate and said anode, at least some of the depolarizing material in said receptacle being placed in solution in response to the admission of the solution including the electrolyte to said receptacle from said container through the aperture in said planar partition wall to form a depolarizing solution of greater density than the remaining solution including the electrolyte, the heavier depolarizing solution and the remaining solution including the electrolyte dissociating themselves from each other to define a separation level therebetween, whereby the depolarizing solution enters said container through the aperture in said planar partition wall from said receptacle to continuously displace the remaining solution including the electrolyte in the region immediately above said cathode plate for maintaining the separation level above said cathode plate to cover said cathode plate with a layer of the depolarizing solution and accomplish continuous depolarization of said cathode plate, the height of the separation level between the depolarizing solution and the remaining solution including the electrolyte in said container being substantially equal to the height on said planar partition wall where the aperture therethrough occurs, a unitary top cover on said case closing said container and said receptacle, and a pair of filler plugs removably disposed in said top cover, said filler plugs being located above said container and said receptacle respectively to provide access thereto.

References Cited in the file of this patent

UNITED STATES PATENTS

| | | |
|---|---|---|
| 119,763 | Himmer | Oct. 10, 1871 |
| 306,796 | Zobel | Oct. 21, 1884 |
| 688,788 | Lurye | Dec. 10, 1901 |
| 2,547,909 | George et al. | Apr. 3, 1951 |

FOREIGN PATENTS

| | | |
|---|---|---|
| 2,836 | Great Britain | Nov. 1, 1866 |